US009851508B2

(12) United States Patent
Hamel-Bissell (10) Patent No.: US 9,851,508 B2
(45) Date of Patent: Dec. 26, 2017

(54) WAVELENGTH SELECTIVE SWITCH FOR MULTIMODE OPTICAL SYSTEMS

(71) Applicant: Finisar Corporation, Sunnyvale, CA (US)

(72) Inventor: Brendan Hamel-Bissell, Stanford, CA (US)

(73) Assignee: Finisar Corporation, Sunnyvale, CA (US)

( * ) Notice: Subject to any disclaimer, the term of this patent is extended or adjusted under 35 U.S.C. 154(b) by 23 days.

(21) Appl. No.: 15/053,883

(22) Filed: Feb. 25, 2016

(65) Prior Publication Data

US 2016/0246006 A1    Aug. 25, 2016

Related U.S. Application Data

(60) Provisional application No. 62/120,592, filed on Feb. 25, 2015.

(51) Int. Cl.
*G02B 6/293* (2006.01)
*G02B 6/32* (2006.01)
*G02B 6/35* (2006.01)

(52) U.S. Cl.
CPC ............ *G02B 6/2938* (2013.01); *G02B 6/32* (2013.01); *G02B 6/356* (2013.01); *G02B 6/29304* (2013.01); *G02B 6/3512* (2013.01)

(58) Field of Classification Search
CPC  G02B 6/293; G02B 6/29304; G02B 6/29305; G02B 6/2931; G02B 6/29311; G02B 6/29313; G02B 6/29379; G02B 6/2938; G02B 6/29386; G02B 6/29395; G02B 6/32; G02B 6/35; G02B 6/3518; G02B 6/3512; G02B 6/354; G02B 6/356; G02B 6/3564
See application file for complete search history.

(56) References Cited

U.S. PATENT DOCUMENTS 7,346,234 B2 *   3/2008   Davis ................ G02B 6/29311
                                                 385/15
9,103,992 B1 *   8/2015   Day ...................... G02B 6/3512

* cited by examiner

*Primary Examiner* — John M Bedtelyon
(74) *Attorney, Agent, or Firm* — Maschoff Brennan (57) ABSTRACT

In an example embodiment, a WSS may include a steering element, an optical subsystem, and a cylindrical lens. The optical subsystem may include a collimating lens and a dispersive element. The optical subsystem may be located between a fiber array and the steering element. The collimating lens may be located between the fiber array and the dispersive element. The cylindrical lens may be located between the optical subsystem and the steering element.

17 Claims, 7 Drawing Sheets

WAVELENGTH SELECTIVE SWITCH FOR MULTIMODE OPTICAL SYSTEMS

CROSS REFERENCE TO RELATED APPLICATION

This application claims the benefit of and priority to U.S. Provisional Application No. 62/120,592, filed Feb. 25, 2015, which is incorporated herein by reference.

FIELD

The embodiments discussed herein are related to a wavelength selective switch (WSS) for multimode optical systems.

BACKGROUND

Unless otherwise indicated herein, the materials described herein are not prior art to the claims in the present application and are not admitted to be prior art by inclusion in this section.

In a wavelength division multiplexing (WDM) optical communication system, information is carried by multiple channels, each channel having a unique wavelength. WDM allows transmission of data from different sources over the same fiber optic link simultaneously, since each data source is assigned a dedicated wavelength component, or channel. The result is an optical communication link with an aggregate bandwidth that increases with the number of wavelengths, or channels, incorporated into the WDM signal. In this way, WDM technology maximizes the use of an available fiber optic infrastructure; what would normally require multiple optic links or fibers instead requires only one.

Some WDM networks use WSS devices to dynamically route wavelength channels from a source to a destination. WSS devices often rely on wavelength manipulation elements such as liquid crystal on silicon (LCOS) devices or micro-electromechanical (MEMS) mirror arrays to perform the routing.

The subject matter claimed herein is not limited to embodiments that solve any disadvantages or that operate only in environments such as those described above. Rather, this background is only provided to illustrate one example technology area where some embodiments described herein may be practiced.

SUMMARY

Some example embodiments described herein generally relate to a WSS for multimode optical systems.

In an example embodiment, a WSS may include a steering element, an optical subsystem, and a cylindrical lens. The optical subsystem may include a collimating lens and a dispersive element. The optical subsystem may be located between a fiber array and the steering element. The collimating lens may be located between the fiber array and the dispersive element. The cylindrical lens may be located between the optical subsystem and the steering element.

In an example embodiment, a wavelength selective switch ("WSS") may include an optical subsystem, a cylindrical lens, and a steering element. The optical subsystem may be configured to collimate and demultiplex an input multimode optical signal into input discrete wavelength channels. The optical subsystem may be configured to receive the input multimode optical signal from an input fiber of a fiber array that includes the input fiber and multiple output fibers. The cylindrical lens may be configured to focus in one dimension the input discrete wavelength channels onto a steering element. The cylindrical lens may be positioned substantially one focal length of the cylindrical lens from the optical subsystem and substantially one focal length of the cylindrical lens from the steering element. The steering element may be configured to independently redirect the input discrete wavelength channels such that the redirected input discrete wavelength channels become output discrete wavelength channels. The cylindrical lens may be further configured to diverge in one dimension the output discrete wavelength channels onto the optical subsystem. The optical subsystem may be further configured to converge the output discrete wavelength channels onto at least one output fiber.

In an example embodiment, a method may include collimating an input multimplexed multimode optical signal. The method may also include demultimplexing the input multimode optical signal into discrete wavelength channels. The method may also include focusing the discrete wavelength channels in one dimension such that the discrete wavelength channels are incident on a steering element in substantially different locations. The method may also include selectively redirecting the discrete wavelength channels. The method may also include collimating the redirected discrete wavelength channels in one dimension. The method may also include converging each of the redirected discrete wavelength channels into at least one output fiber.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the embodiments will be set forth in the description which follows, and in part will be obvious from the description, or may be learned by the practice of the embodiments. The features and advantages of the embodiments may be realized and obtained by means of the instruments and combinations particularly pointed out in the appended claims. These and other features of the embodiments will become more fully apparent from the following description and appended claims, or may be learned by the practice of the embodiments as set forth hereinafter.

BRIEF DESCRIPTION OF THE DRAWINGS

To further clarify the above and other advantages and features of the present embodiments, a more particular description of the embodiments will be rendered by reference to the appended drawings. It is appreciated that these drawings depict only typical embodiments and are therefore not to be considered limiting of its scope. The embodiments will be described and explained with additional specificity and detail through the use of the accompanying drawings in which.

DESCRIPTION OF EMBODIMENTS

WDM optical communication systems can be used to transmit large amounts of data through fiber cables. One advantage of WDM optical communication systems is the ability to simultaneously transmit numerous optical signals composed of multiple discrete wavelength channels ("channel") multiplexed over the same optical fiber ("fiber"). Furthermore, a WSS allows each channel to be steered independently from an input fiber to any desired output fiber.

Fibers typically come in two primary varieties, multimode fiber (MMF) and single mode fiber (SMF). SMF has a relatively smaller diameter than MMF and typically requires a more precise source to transmit an efficient optical signal. MMF, however, is much broader in diameter and can use more energy efficient signal sources such as VCSEL and LED light sources. However, a common problem associated with MMF is the inability to effectively steer discrete wavelength channels independently. The present disclosure relates to wavelength selective switching with MMF configurations.

Embodiments of the present disclosure will be explained with reference to the accompanying drawings.

Figure 1A:
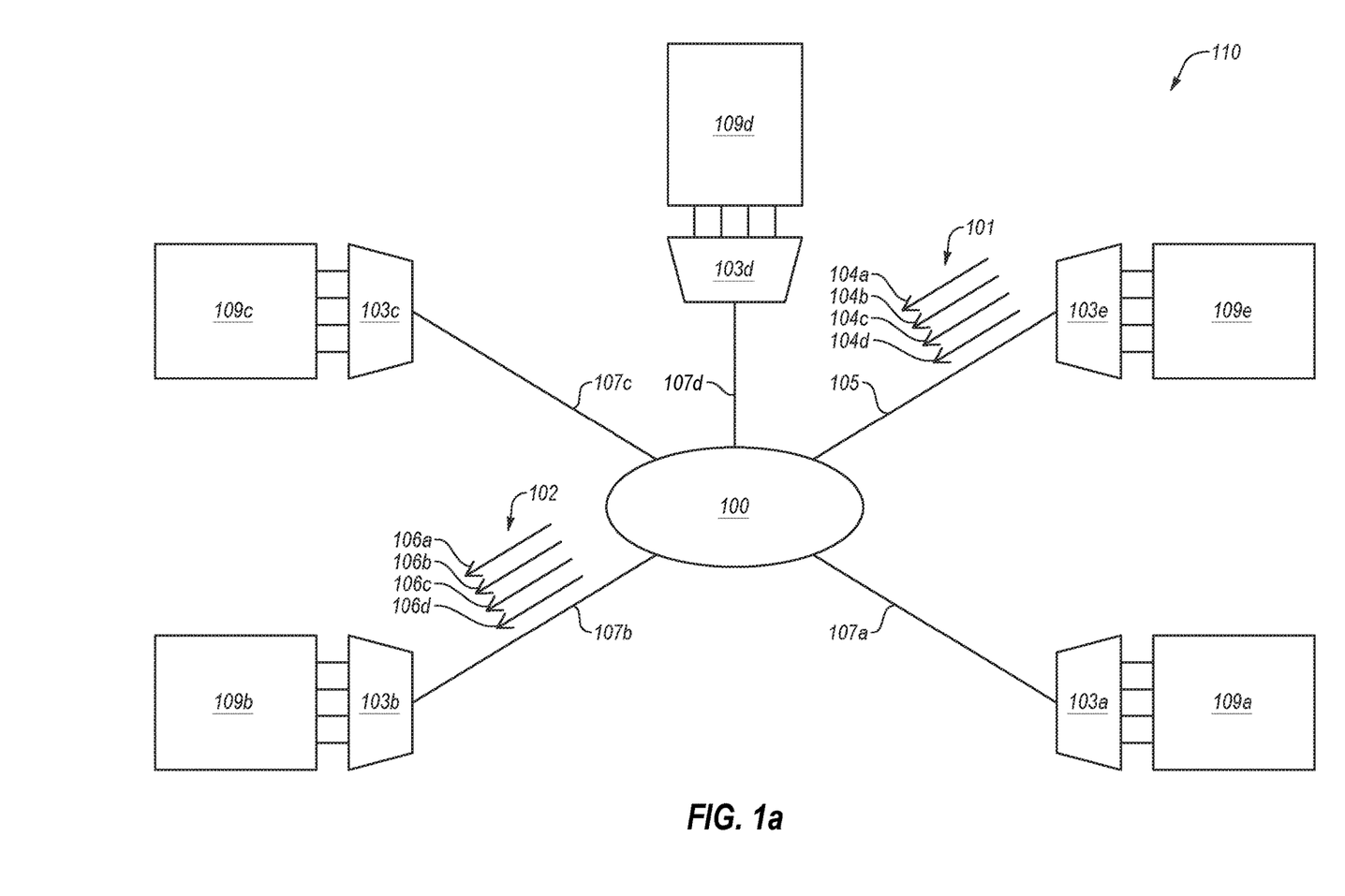
FIG. 1a is a block diagram of an example optical system that includes a WSS directing all discrete wavelength channels to one output fiber.
Figure 1B:
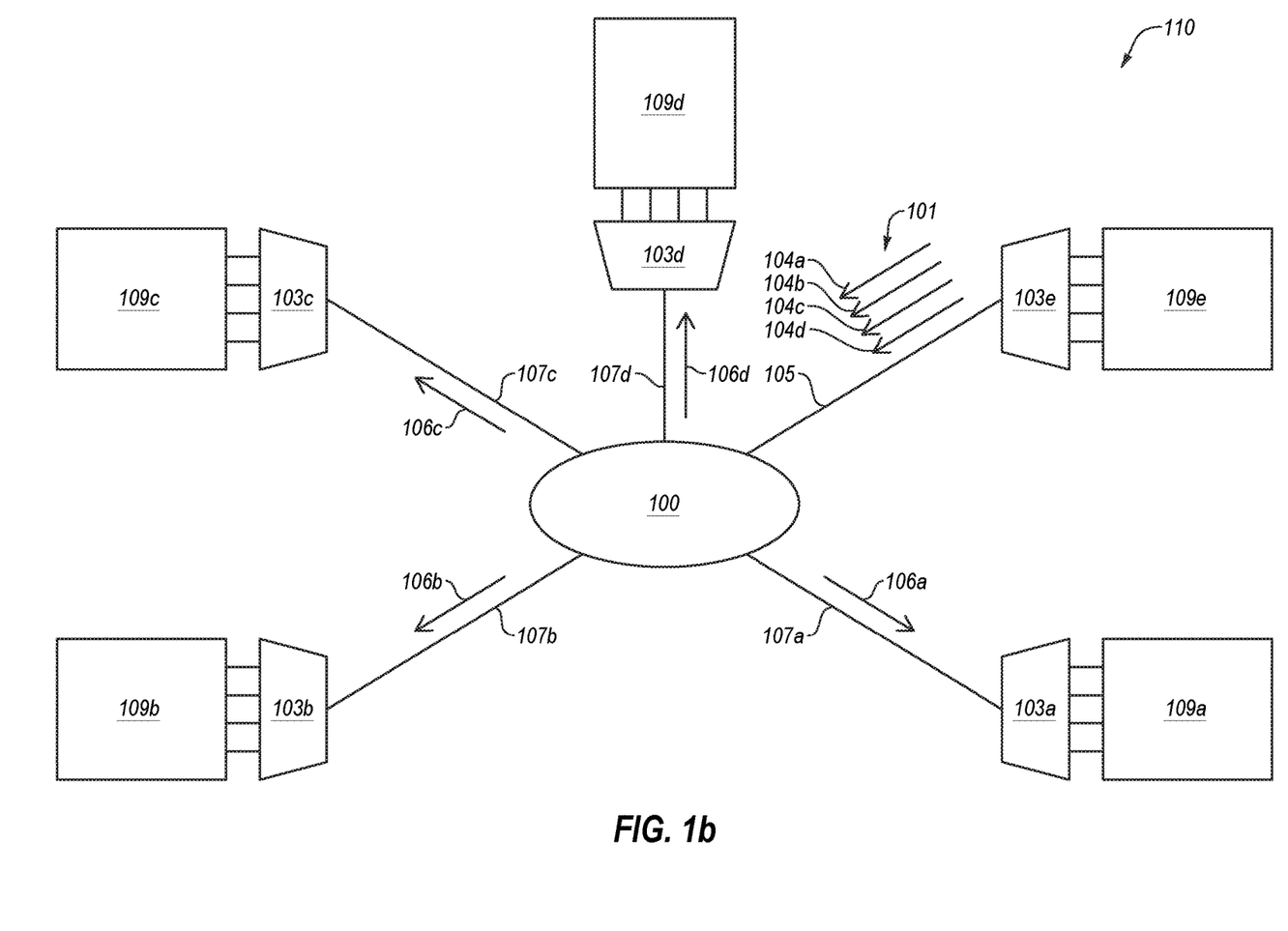
FIG. 1b is a block diagram of the optical system of FIG. 1a with the WSS directing discrete wavelength channels to different output fibers.

FIG. 1a is a block diagram of an example optical system 110 that includes a WSS 100 directing all discrete wavelength channels to one output fiber 107b, arranged in accordance with at least one embodiment described herein. FIG. 1b is a block diagram of the optical system 100 of FIG. 1a with the WSS 100 directing discrete wavelength channels to different output fibers 107a-107d (generically "output fiber 107" or "output fibers 107"), arranged in accordance with at least one embodiment described herein. The optical system 110 may also include one or more WDM devices 103a-103e (generically "WDM device 103" or "WDM devices 103"), an input fiber 105, a multiplexed multimode input optical signal denoted at 101 (hereinafter "input signal 101"), a multiplexed multimode output optical signal denoted at 102 (hereinafter "output signal 102", illustrated only in FIG. 1a), and one or more communication modules 109a-109e (generically "module 109" or "modules 109").

One or more of the modules 109 may be configured to convert one or more electrical signals (e.g., from a host device) to one or more optical signals for transmission within the optical system 110. For example, the module 109e may be configured to convert one or more electrical signals to, e.g., four (or some other number) multimode optical signals that are multiplexed by the WDM device 103e onto the input fiber 105 as the input signal 101. In this example, the WDM device 103e may include a multiplexer (MUX). The input signal 101 may include four input wavelength channels 104a-104d (generically "input channel 104" or "input channels 104") and each input channel 104 may include a corresponding one of the optical signals output by the module 109e. The input channels 104 of the input signal 101 can be selectively routed by the WSS 100 to any output fiber 107. For example, in the embodiment depicted in FIG. 1a, the input channels 104 of the input signal 101 are routed to the output fiber 107b and, in the output fiber 107b, are referred to as output wavelength channels 106a-106d (generically "output channel 106" or "output channels 106") of the output signal 102. The output signal 102 may be demultiplexed by the WDM device 103b into four (or some other number) multimode optical signals on separate optical paths that are received by the module 109b and converted thereby to one or more electrical signals that may be provided to a host device. In this example, the WDM device 103b may include a demultiplexer (DEMUX). The multiple optical signals provided to the module 109b may each include a corresponding one of the output channels 106.

Additionally or alternatively, the WSS 100 may be configured to independently route any input channel 104 as a corresponding output channel 106 to any output fiber 107. In the example embodiment depicted in FIG. 1b, the input channel 104a is routed to the output fiber 107a as the output channel 106a, the input channel 104b is routed to the output fiber 107b as the output channel 106b, the input channel 104c is routed to the output fiber 107c as the output channel 106c, and the input channel 104d is routed to the output fiber 107d as the output channel 106d.

In the example of FIG. 1b, each WDM device 103a-103d receives a single one of the output channels 106 (as opposed to receiving multiple ones of the output channels 106 in a multiplexed signal, as in FIG. 1a). Accordingly, each WDM device 103a-103d may pass a corresponding one of the output channels 106 through to the corresponding module 109a-109d without performing any demultiplexing. Accordingly, the module 109a receives the output channel 106a, the module 109b receives the output channel 106b, the module 109c receives the output channel 106c, and the module 109d receives the output channel 106d. Each module 109a-109d may convert the corresponding output channel 106 to an electrical signal that may be provided to a corresponding host device to which each module 109a-109d is communicatively coupled.

The input fiber 103 and the output fibers 107 may each be composed of any MMF such as OM1, OM2, OM3, OM4 or any other MMF. Two common varieties of MMF suitable for at least some embodiments described herein include graded index fiber and step index fiber.

The input fiber 105 and the output fibers 107 may be substantially physically identical, where the input fiber 105 may include the fiber currently carrying the input signal 101 to the WSS 100 and the output fiber 107 may include the fiber carrying any one or more of the output channels 106 to a corresponding one of the WDMs 103. As such, the input fiber 105 may function as an output fiber 107 and any of the output fibers 107 may function as the input fiber 105 based on the origin of the input signal 101 and the destination(s) of the output channels 106. Accordingly, the optical system 110 may include any number of configurations and orientations of the aforementioned components. In these and other implementations, the input fiber 105 and the output fibers 107 may be implemented as simplex (e.g., one-way) or duplex (e.g., two-way) optical fibers. Alternatively or additionally, one or more of the modules 109 may each be communicatively coupled to the WSS 100 by two or more optical fibers, one or more of which is a dedicated input fiber(s) and one or more of which is a dedicated output fiber(s).

Figure 2A:
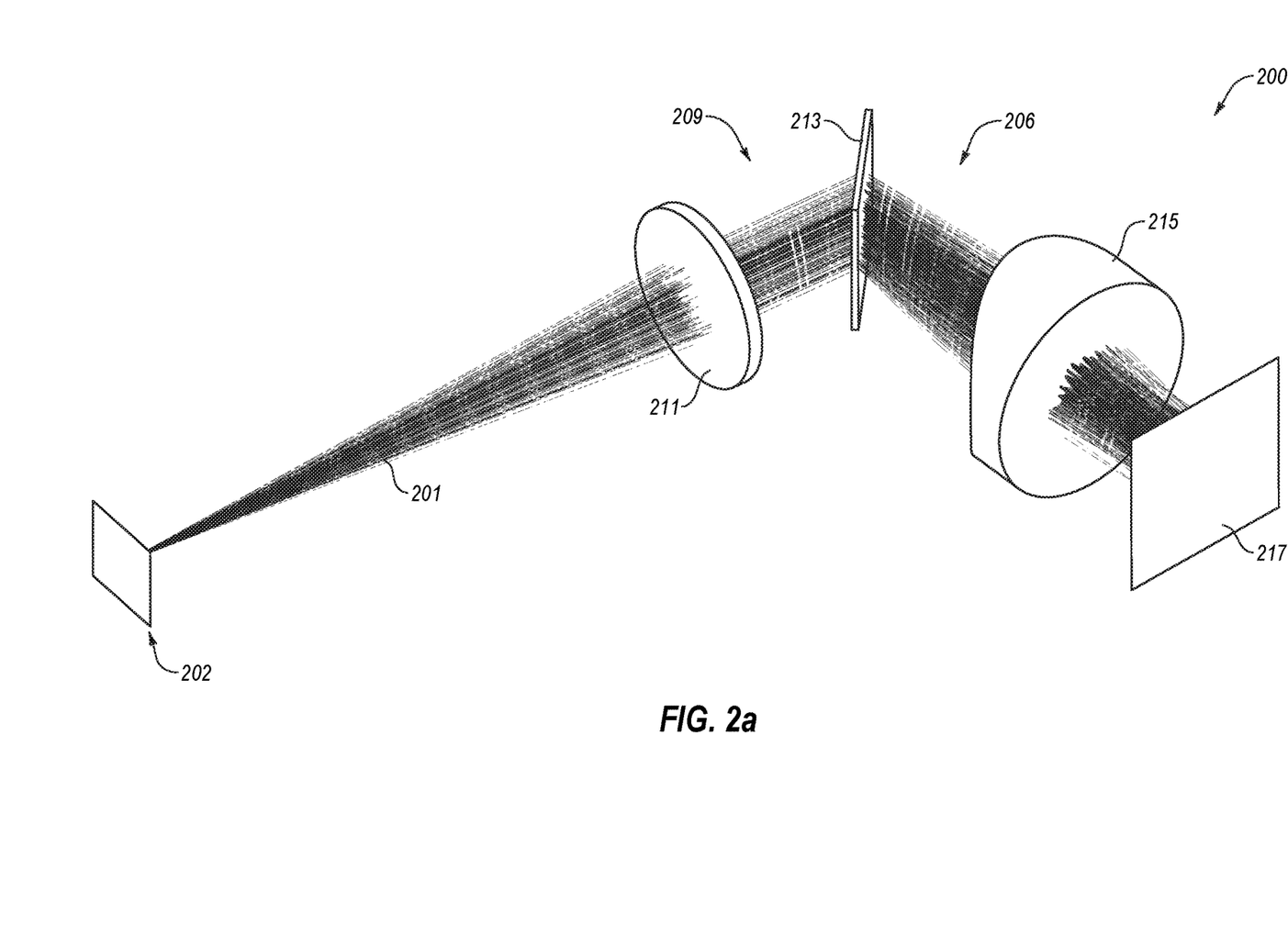
FIGS. 2a-2d illustrate various views of an example WSS such as may be implemented in the optical system of FIGS. 1a-1b.
Figure 2B:
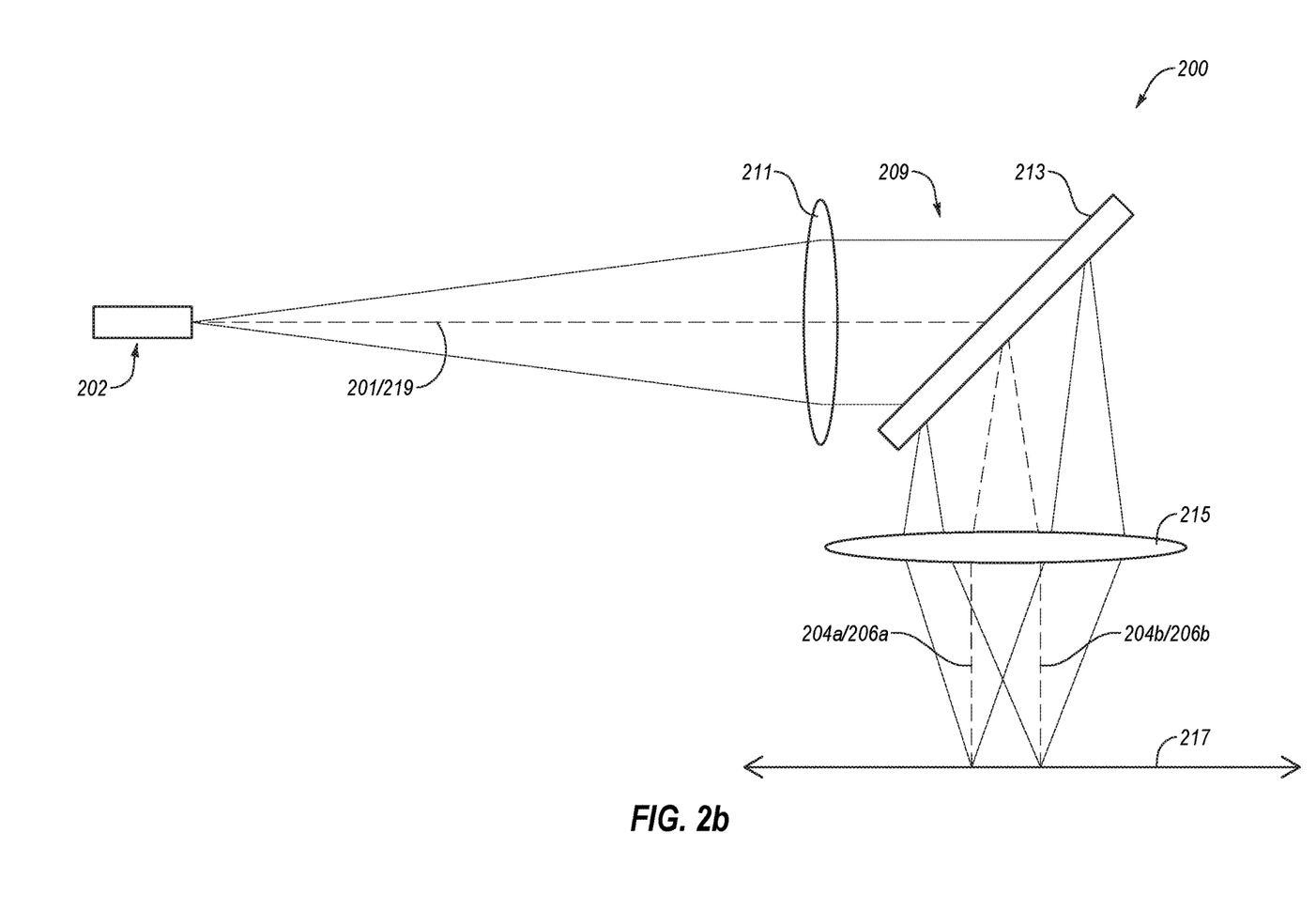
Figure 2C:
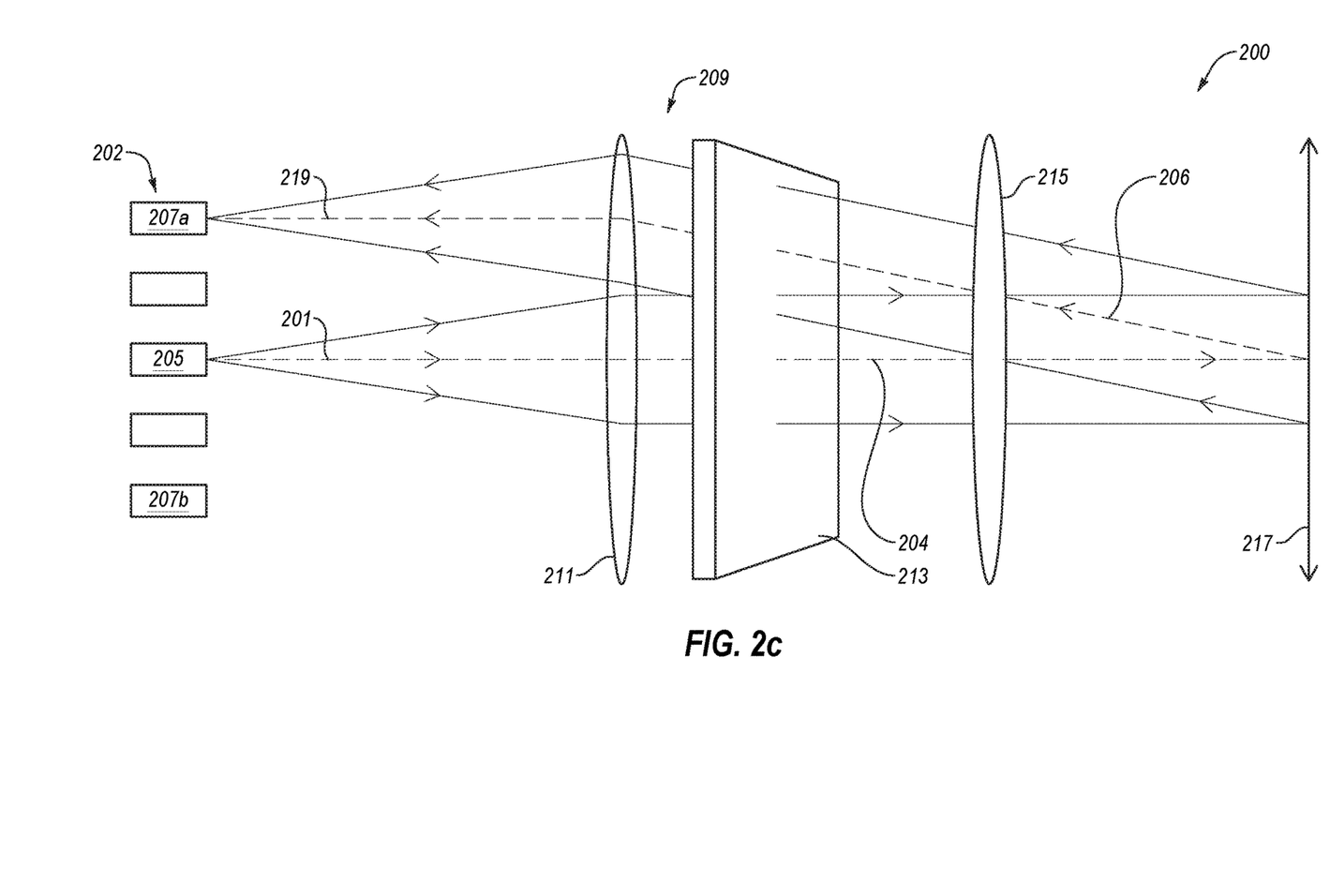
Figure 2D:
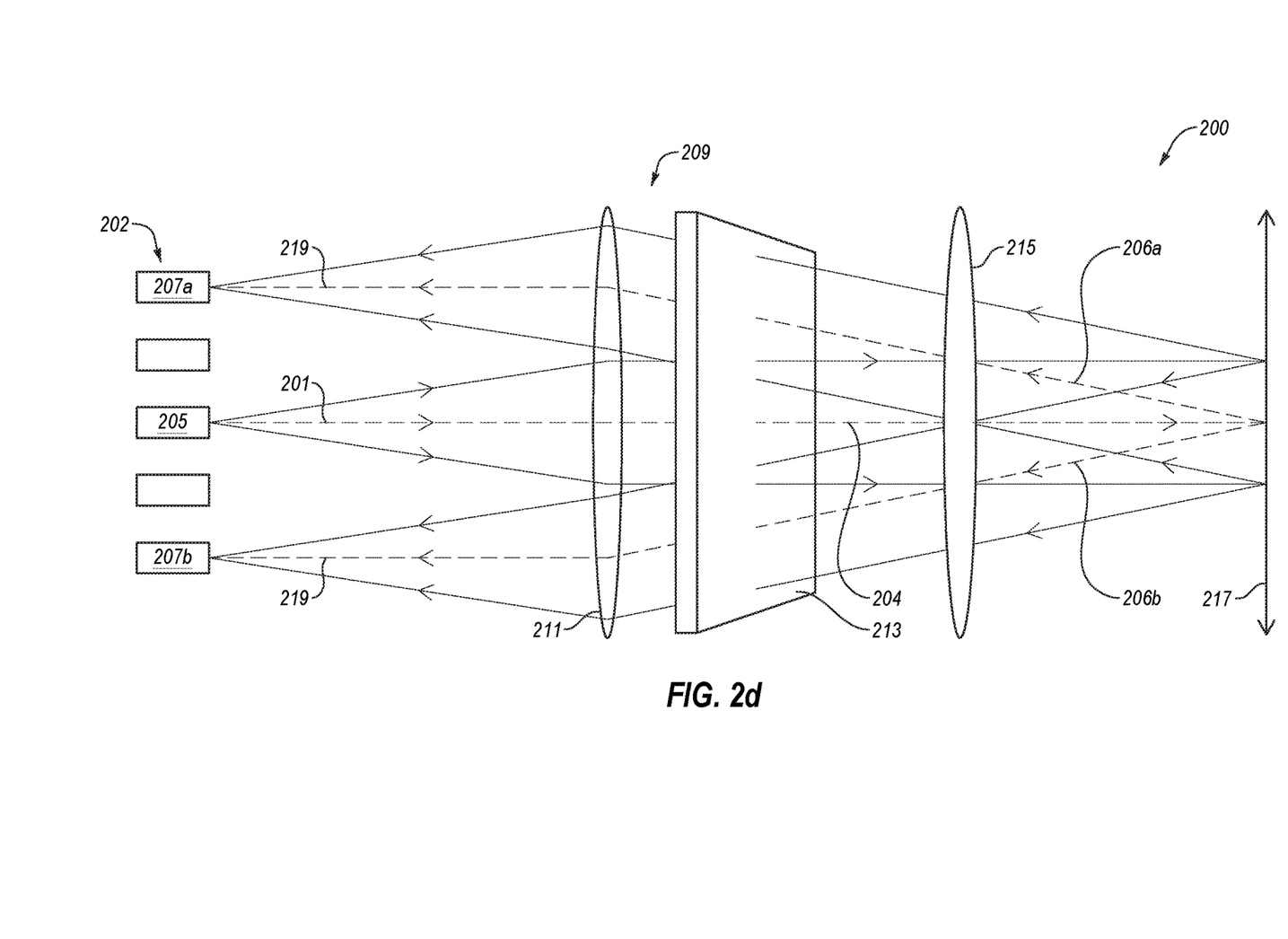

FIGS. 2a-2d illustrate various views of an example WSS 200 such as may be implemented in the optical system 110 of FIGS. 1a-1b, arranged in accordance with at least one embodiment described herein. The WSS 200 of FIGS. 2a-2d is an example embodiment of the WSS 100 of FIGS. 1a-1b. Accordingly, the WSS 200 of FIGS. 2a-2d may have the same or similar features as the WSS 100 of FIGS. 1a-1b. FIG. 2a depicts an isometric view of the WSS 200. FIG. 2b depicts an overhead view of the WSS 200. FIGS. 2c-2d depict side views of the WSS 200 in which the WSS 200 directs discrete wavelength channels to one output (FIG. 2c) or to different outputs (FIG. 2d).

The WSS 200 may include an optical subsystem 209; a cylindrical lens 215; and a steering element 217. The WSS 200 may receive a multiplexed multimode input optical signal denoted at 201 (hereinafter "input signal 201") from an input fiber 205 (FIGS. 2c-2d) included in a fiber array 202. The input signal 201 may include or correspond to the input signal 101 of FIGS. 1a-1b. As will be described in more detail herein, the input signal 201 (or more particularly, input wavelength channels (hereafter "input channels") included therein) may be processed by the WSS 200 and may be output as one or more output signals 219 (FIGS. 2c-2d) to one or more output fibers included in the fiber array 202. In some embodiments, the one or more output signals 219 include a multiplexed multimode output optical signal made up of multiple output wavelength channels (hereafter "output channels") and output to a single one of the output fibers, as illustrated in FIG. 2c. The multiplexed multimode output optical signal may include or correspond to the output signal 102 of FIGS. 1a-1b. In other embodiments, the one or more output signals 219 include multiple output channels output to different output fibers, as illustrated in FIG. 2d.

The fiber array 202 may include the input fiber 205 that may include or correspond to the input fiber 105 of FIGS. 1a-1b, and multiple output fibers 207a-207b (FIGS. 2c-2d, hereafter "output fibers 207"), that may include or correspond to the output fibers 107 of FIGS. 1a-1b. In FIGS. 2c-2d, two unlabeled fibers of the fiber array 202 may include one or more additional input fibers 205 and/or one or more additional output fibers 207. In the example of FIGS. 2a-2d, the fibers in the fiber array 202 (including input fiber 205, output fibers 207, and the unlabeled fibers), or more particularly fiber ends of the fibers in the fiber array 202, may be vertically spaced apart from each other, e.g., generally in a line.

The input fiber 205 may be configured to transmit the input signal 201 into the WSS 200. One or more of the output fibers 207 may be configured to receive the one or more output signals 219. Any number of spacing configurations of the fiber array 202 may be possible. The input fiber 205 and output fibers 207 of the fiber array 202 may be configured in any order or spaced apart at any distance. The input fiber 205 may be located at any location sufficient for transmitting the input signal 201 such that the input signal 201 may interact with the components of the WSS 200. Any output fiber 207 may be located at any position sufficient for receiving a corresponding one of the one or more output signals 219.

For example, the embodiment depicted in FIG. 2c includes the input fiber 205 in the center of the fiber array 202 with the output fibers 207a-207b located at opposite ends of the fiber array 202, each fiber of the fiber array 202 being substantially equally spaced apart, with the input signal 201 transmitted by the input fiber 205; the input signal 201 passing through the center of the optical subsystem 209, passing through the center of the cylindrical lens 215, and falling incident on the steering element 217; the single output signal 219 (e.g., a multiplexed multimode output optical signal made up of multiple output channels) reflected off the steering element 217, passing through the top half of the cylindrical lens 215 and the optical subsystem 209, and converging on the output fiber 207a.

The input signal 201 may include any number of input channels 204a-204b (FIG. 2b, hereinafter "input channels 204"). Before passing through the optical subsystem 209, the input channels 204 may be part of the same input signal 201. However, the input signal 201 may be dispersed (e.g., diffracted or refracted) as separate input channels 204. For example, the embodiment depicted in FIGS. 2a-2d includes the optical subsystem 209 that may be configured to separate the input channels 204 horizontally, as best seen in FIG. 2b. Thus, when viewed from the side as shown in FIGS. 2c-2d, the channels 204 substantially appear as the same input signal 201. However, when viewed from above as shown in FIG. 2b, it can be seen that the input signal 201 is dispersed into the input channel 204a and the input channel 204b. Thus, the input channel 204a and the input channel 204b are present in all of FIGS. 2a-2d even when viewing angles do not allow distinguishing therebetween. Additionally, the input signal 201 is not limited to two input channels 204 and may more generally include two or more input channels 204.

The one or more output signals 219 may include multiple output channels 206a-206b (hereafter "output channels 206") that have been individually steered by the steering element 217. The output channels 206 may be individually steered by virtue of the corresponding input channels 204 being incident on the steering element 217 at regions of the steering element 217 that are horizontally spaced apart from each other, as illustrated in FIGS. 2a-2b. Each region of the steering element 217 may be independently controlled to reflect the corresponding input channel 204 upward or downward, thereby steering the corresponding output channel 206 upward or downward. In these and other implementations, each output channel 206 includes a corresponding input channel 204 after reflection thereof by the steering element 217.

In the example of FIGS. 2a-2d, the steering element 217 is configured to steer wavelengths substantially up and down as output channels 206. The output channels 206 generally follow vertically-displaced versions of the optical paths followed by the input channels 204, thus when viewed from above as in FIG. 2b, the output channels 206 appear to traverse the same paths as the input channels 204. Additionally, as depicted in FIG. 2c, when the steering element 217 steers the output channels 206 upward or downward by an equal amount, the output channels 206 will follow the same optical path from the optical subsystem 209 to a corresponding one of the output fibers 207 (e.g., output fiber 207a in FIG. 2c) as a single output signal 219 made up of multiple output channels 206. However, as depicted in FIG. 2d, when the steering element 217 steers the output channels 206 upward or downward by different amounts, the output channels 206 may follow vertically displaced optical paths from the optical subsystem 209 to corresponding ones of the optical fibers 207 as multiple optical signals 219 each made up of a single output channel 206. For instance, in FIG. 2d, the output channel 206a is steered upward and is output as one output signal 219 to the output fiber 207a, while the output channel 206b is steered downward and is output as another output signal 219 to the output fiber 207b. Thus, the output channel 206a and the output channel 206b may be present in FIGS. 2a-2b and 2d even when viewing angles do not allow distinguishing therebetween. The output signal 219 is not limited to two output channels 206 and may more generally include two or more output channels 206 that may be independently steered in any number of directions by the steering element 217.

The optical subsystem 209 may be configured to demultiplex multichannel input signals, such as the input signal 201, sufficient to substantially separate the input channels 204 that make up the input signal 201. In the example of FIGS. 2a-2d, the optical subsystem 209 is configured to disperse the input channels 204 of the input signal 201 horizontally; however the optical subsystem 209 may more generally be configured to disperse the input signal 201 in any direction.

Furthermore, the optical subsystem 209 may include one or more optical components that collectively perform the functions described herein. For example, in the illustrated embodiment, the optical subsystem 209 may include a collimating lens 211 and a dispersive element 213. The collimating lens 211 may be configured to substantially collimate the input signal 201. For example, the embodiment illustrated in FIGS. 2a-2d depicts the input signal 201 diverging prior to the collimating lens 211 and also depicts the input signal 201 as substantially parallel (e.g., collimated) after passing through the collimating lens 211.

The collimating lens 211 may be further configured to focus the one or more output signals 219 onto one or more corresponding ones of the output fibers 207. The collimating lens 211 may include a passive optical element and not determinative as to which output fiber 207 any given output channel 206 of the one or more output signals 219 is directed. Rather, as will be discussed later, the specific output fiber 207 may depend on the reflected angle of the output channels 206 of the output signal 219 from the steering element 217. For example, the embodiment depicted in FIG. 2c illustrates the output channels 206a-206b appearing substantially as one output signal 219, as reflected substantially upward, relative to the WSS 200, and being focused by the collimating lens 211 onto the output fiber 207a.

The collimating lens 211 may include plastic, glass, or any other material suitable for collimating the input signal 201. Also, the collimating lens 211 may include an aspheric lens, a spherical lens, a parabolic lens, or any other shape suitable for collimating the input signal 201. In some implementations, aberrations in the collimating lens 211 may reduce a coupling efficiency of the WSS 200 and as such the collimating lens 211 may be implemented as an aspheric lens to improve the coupling efficiency compared to some other collimating lenses. Additionally, collimating lens 211 may be placed in a location sufficient for the input signal 201 to be substantially collimated. In these and other implementations, the collimating lens 211 may be placed substantially one focal length of the collimating lens 211 from the fiber array 202 and substantially one focal length of the collimating lens 211 from the steering element 217. As used herein, the term "substantially" as applied to any value includes a range defined as the value plus or minus 10% of the value. Thus, "substantially one focal length" includes a range of distances defined as the focal length plus or minus 10% of the focal length. Moreover, insofar as the dispersive element 213 may change (e.g., bend) the general propagation direction of the input signal 201, the distance of the steering element 217 from the collimating lens 211 (e.g., substantially one focal length of the collimating lens 211) may be determined as the distance along an optical path of the input signal 201 (and/or its input channels 204) from the collimating lens 211 to the steering element 217.

The dispersive element 213 may be configured to disperse (e.g., diffract or refract) the collimated input signal 201 into separate input channels 204 in a direction sufficient for wavelength-dependent steering by the steering element 217. This configuration may include positioning the grating 213 at an angle sufficient to receive and disperse the input signal 201 into discrete input channels 204 toward the cylindrical lens 215. In some embodiments, the discrete input channels 204 may overlap in the horizontal direction even after the dispersive element 213 until focused (at least in one direction, e.g., horizontally) on the steering element 217 by the cylindrical lens 215. In an example embodiment, the dispersive element 213 may be oriented at about 45 degrees relative to a propagation direction of the input signal 201 from the fiber array 202 to the dispersive element 213. The dispersive element 213 may be oriented at other angles in other embodiments. Any direction of dispersion (e.g., diffraction or refraction) may be possible, but the direction may determine the orientation and configuration of the other elements of the WSS 200. The direction of dispersion and direction of convergence of the cylindrical lens 215 may be substantially similar. For example, the embodiment depicted in FIG. 2b illustrates the collimated input signal 201 being dispersed horizontally into the input channels 204, each of which is then horizontally converged by the cylindrical lens 215 onto the steering element 217.

The dispersive element 213 may be further configured to direct the output channels 206 of the one or more output signals 219 toward the fiber array 202. This configuration may include positioning the grating 213 at an angle sufficient to receive the output channels 206 of the one or more output signals 219 from the cylindrical lens 215 and direct the output channels 206 of the one or more output signals 219 toward the fiber array 202. For example, the embodiment depicted in FIG. 2b illustrates the output channel 206a and the output channel 206b directed toward the center of the fiber array 202.

The dispersive element 213 may be composed of any number of materials with any number of patterns suitable for dispersion (e.g., diffraction or refraction) of light. For example, the dispersive element 213 may include glass, plastic, or any other material suitable for dispersion of light. These materials may include properties or etch patterns configured to diffract light. Such etch patterns may include lines configured to diffract light, with linear or non-linear line spacing. In these and other implementations, the dispersive element 213 may include a line grating, a pulse compression grating or any other type of grating sufficient for separating the input signal 201 into the input channels 204. Alternatively, the materials making up the dispersive element may have a shape or other configuration suitable to refract light. In these and other embodiments, the dispersive element 213 may include a prism. An efficiency of the dispersive element 213 may be configured to be sufficient to allow the output signal 219 to be transmitted as an optical signal by any output fiber 207.

The cylindrical lens 215 may be configured to converge the input channels 204 of the input signal 201 in one dimension onto the steering element 217. The dimension of convergence may substantially correspond with the dispersion of optical subsystem 209. Accordingly, if the optical subsystem 209 (and more particularly, the dispersive element 213) disperses the input channels 204 horizontally, the cylindrical lens 215 may converge the input channels 204 horizontally. This configuration may include positioning the cylindrical lens 215 in a location sufficient for receiving the input channels 204 of the input signal 201 from the optical subsystem 209 and converging in one dimension the input channels 204 onto the face of the steering element 217. For example, FIG. 2b illustrates the input channels 204 being converged horizontally by the cylindrical lens 215 onto the steering element 217, whereas FIGS. 2c and 2d illustrate the input channels 204 not being converged vertically by the cylindrical lens 215. There is no limitation to the number of input channels 204 the cylindrical lens 215 may converge.

The cylindrical lens 215 may further be configured to collimate, in the same dimension as convergence, multiple output channels 206 of the one or more output signal 219 and to direct the one-dimensionally collimated output channels 206 onto the optical subsystem 209. This configuration may include positioning the cylindrical lens 215 in a location sufficient to receive the output channels 206. For example, in the embodiment of FIGS. 2a and 2b, the cylindrical lens 215 horizontally collimates the output channel 206a and the output channel 206b and directs the horizontally-collimated output channels 206a and 206b toward the optical subsystem 209. There is no limitation to the number of output channels 206 the cylindrical lens 215 may collimate and direct.

The cylindrical lens 215 may include plastic, glass, or any other material suitable for optical lenses. Also, the cylindrical lens 215 may be configured as plano-concave, plano-convex or any other in any shape suitable for converging the input channels 204 in one dimension onto the steering element 217, collimating, in the same direction as convergence, the output channels 206, and directing the one-dimensionally collimated output channels 206 onto (or into or towards) the optical subsystem 209. Additionally, the cylindrical lens 215 may be placed in a location sufficient for the input channels 204 to be focused in one dimension onto the steering element 217, for the output channels 206 to be one-dimensionally collimated, and for the one-dimensionally collimated output channels 206 to be directed toward the optical subsystem 209. In these and other implementations, the cylindrical lens 215 may be placed substantially one focal length of the cylindrical lens 215 from the steering element 217 and substantially one focal length of the cylindrical lens 215 from the optical subsystem 209.

The focal length of the cylindrical lens 215 may be selected based on the dispersive properties of the optical subsystem 209. Alternatively, the optical subsystem 209 with certain dispersive properties may be selected based on a selected focal length of the cylindrical lens 215. Various configurations or properties (e.g. line density) of the optical subsystem 209 may disperse the input channels 204 of the input signal 201 such that the input channels 204 substantially separate at various distances or angles from the optical subsystem 209. Additionally, these dispersion distances or angles from the optical subsystem 209 may also be affected by the wavelengths of the input channels 204 of the input signal 201. The properties, configuration, position, orientation, and relationship between/of the cylindrical lens 215 and the optical subsystem 209 may be selected by considering these factors, such that the input channels 204 of the input signal 201 may be steered by the steering element 217. For example, in some implementations, the focal length of the cylindrical lens 215 may be selected such that the cylindrical lens 215 may focus the input channels 204 of the input signal 201 onto the steering element 217 in a manner in which the input channels 204 of the input signal 201 do not overlap at all or by much on the face of the steering element 217.

The steering element 217 may be configured to selectively steer any number of incident input channels 204. A number of known devices are capable of selective wavelength steering, such as liquid silicon on crystal ("LCOS") and microelectromechanical mirrors ("MEMS"). Any type of steering device sufficient for selectively and independently steering multiple input channels 204 may be used as the steering element 217. In the embodiment of FIGS. 2a-2d, the steering device 217 includes a LCOS device. The steering element 217 may be configured to independently steer individual input channels 204 as output channels 206 to any output fiber 207. For example, in the embodiment of FIG. 2d, the input channel 204a is reflected off the steering element 217 as the output channel 206a and is steered to the output fiber 207a and the input channel 204b is reflected off the steering element 217 as the output channel 206b and is steered to the output fiber 207b.

Alternatively or additionally, the steering element 217 may be configured to steer multiple input channels 204 as output channels 206 to the same output fiber 207. For example, in the embodiment of FIG. 2c, the input channel 204a and the input channel 204b (both labeled as "204" in FIG. 2c due to viewing angle) are reflected off the steering element 217 as the output channel 206a and the output channel 206b (both labeled as "206" in FIG. 2c due to viewing angle) and are both steered to the same output fiber 207a. The steering element 217 may be configured to steer any number of input channels 204 to any number of output fibers 207, with any combination of output channels 206 and output fibers 207 possible.

Furthermore, the steering element 217 may be configured to steer the input channels 204 as output channels 206 to any different output fiber 207 at any time. Embodiments of the steering element 217 such as the LCOS allow the input channels 204 to be directed as output channels 206 to different output fibers 207 by programing the LCOS to reflect the incident input channels 204 as the output channels 206 at any desired angle, determined by the wavelength of the input channel 204. Thus, any input channel 204 can be steered as a reflected output channel 206 to a new output fiber 207 by changing the configuration of the steering element 217.

Figure 3:
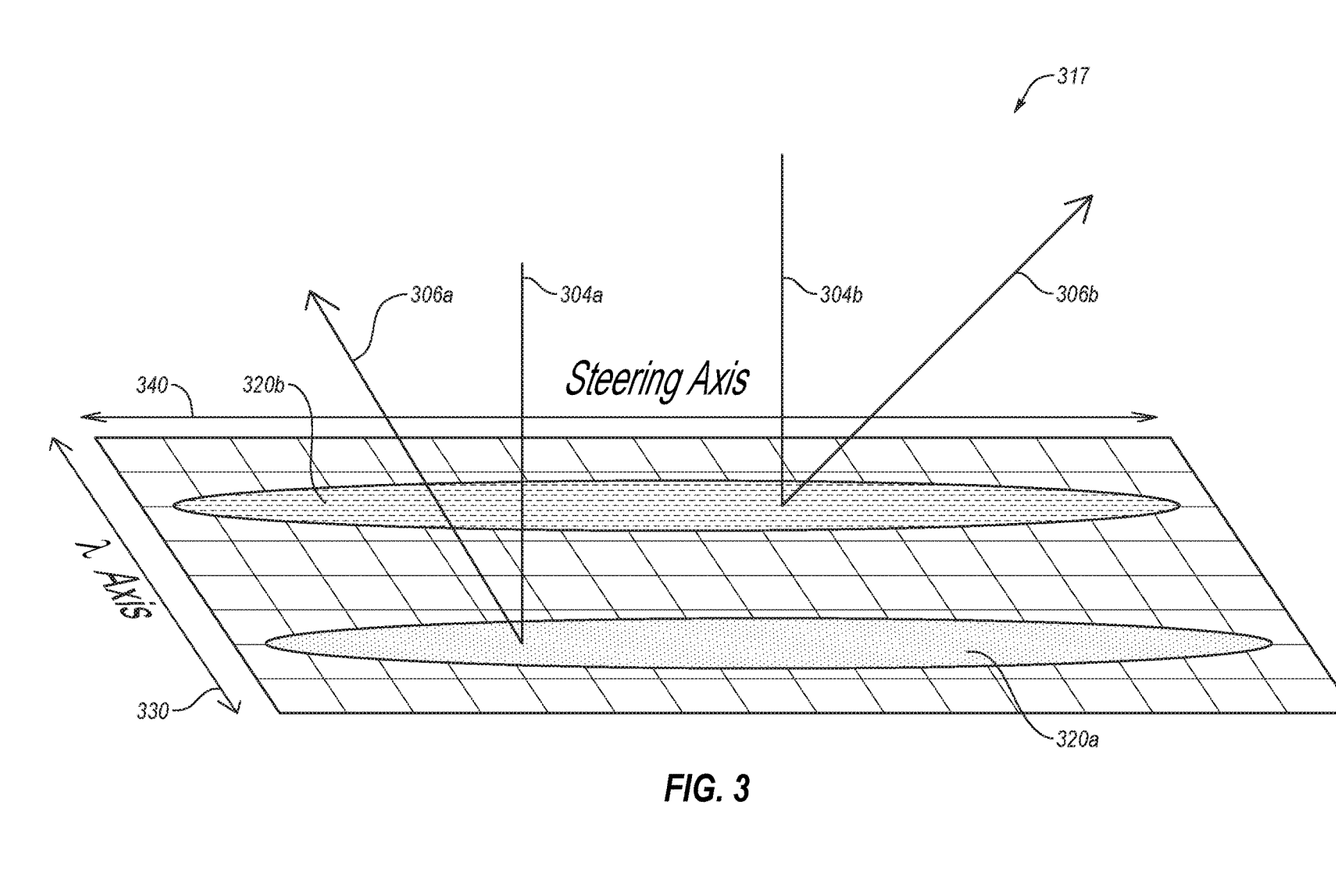
FIG. 3 illustrates an isometric view of an example steering element that may be implemented in the WSS of FIGS. 2a-2d, all arranged in accordance with at least one embodiment described herein.

FIG. 3 illustrates an isometric view of an example steering element 317 that may be implemented in the WSS 200 of FIGS. 2a-2d, arranged in accordance with at least some embodiments described herein. The steering element 317 may include or correspond to the steering element 217 of FIGS. 2a-2d. The steering element 317 may include a steering axis 340, a wavelength axis 330, and one or more incident channel images ("image") 320a-320b (generically "image 320" or "images 320"). The steering axis 340 of FIG. 3 may be parallel to vertical or a vertical direction, which vertical or vertical direction may be at least inferred from the discussion of FIGS. 2a-2d. The wavelength axis 330 may be parallel to horizontal or a horizontal direction, which horizontal or horizontal direction may be at least inferred from the discussion of FIGS. 2a-2d.

The images 320 may be formed by incident input wavelength channels 304a-304b (generically "input channel 304" or "input channels 304") that may have the same or similar features as the input channels 204 of FIGS. 2a-2d. The steering element 317 may be configured to reflect the images 320 as output wavelength channels 306a (generically "output channel 306" or "output channels 306"), which may have the same or similar features as the output channels 206. In the example depicted in FIG. 3, the incident input channel 304a is reflected as the output channel 306a at a different angle of reflection than the angle of incidence of the input channel 304a, as determined by the steering element 317. Similarly, the incident input channel 304b is reflected as the output channel 306b at a different angle of reflection than the angle of incidence of the input channel 304b, as determined by the steering element 317.

The images 320 may be narrower with respect to the wavelength axis 330 than with respect to the steering axis 340 as a result of a corresponding cylindrical lens (e.g., the cylindrical lens 215 of FIGS. 2a-2d) converging the input channels in one dimension (e.g., in the horizontal direction which may be parallel to the wavelength axis). In some embodiments of the steering element 317, a narrower image 320 with respect to the wavelength axis 330 may produce more precisely steered output channels 306.

Additionally, images 320 may be configured to fall incident on the face of the steering element 317 such that there is no substantial overlap between images 320 on the face of the steering element 317. For example, in FIG. 3, the image 320*a* and the image 320*b* are on the face of the steering element 317 in different locations with no overlap between the image 320*a* and the image 320*b*. In other embodiments, there may be some overlap between the image 320*a* and the image 320*b*, such as less than 2%, less than 5%, less than 10%, or less than some other percentage of overlap.

Returning to FIGS. 2*a*-2*d*, other variations of the WSS 200 may include configuring the steering element 217 to steer at least one of the one or more output signals 219 to the input fiber 205. Thus, the WSS 200 may be configured to allow the input fiber 205 and the output fiber 207 to be the same fiber. Additionally, the output signal 219 is not limited to travel through the same optics or traverse a similar path traveled by the input signal 201. Rather, the WSS 200 may include multiple optical subsystems 209 and cylindrical lenses 215. For example, one such embodiment may include a separate mirror to redirect the one or more output signals 219 to such separate components configured to direct the one or more output signals 219 on any output fiber 207. Another such embodiment may include the steering element 217 reflecting the one or more output signals 219 to such separate components configured to direct the one or more output signals 219 on any output fiber 207. Thus, the output signal 219 is not limited to travel back through the exact same optical components of the WSS 200 as the input signal 201. Also, the output fiber 207 does not have to be located within the same fiber array 202 as the input fiber 205, but may be positioned independent of the input fiber 205, the other components of the WSS 200 may be positioned sufficient to direct the one or more output signals 219 to the output fiber 207.

Modifications can be made to the WSS 200 without changing the scope of the disclosure. The positions, orientations, configurations, and relationships between the individual components of the WSS 200 may be altered such that the coupling efficiency of the WSS 200 is reduced. While such alterations may decrease the efficiency of the WSS 200, the coupling efficiency of the WSS 200 may still be sufficiently high to steer the output channels 206 of the output signal 219 to the output fibers 207.

Moreover, the components of the WSS 200 do not have to steer every input channel 204 of the input signal 201 or every output channel 206 of the one or more output signals 219 to an output fiber 207. Rather the components of the WSS 200 may only interact with the input channel 204 or the output channel 206 desired for steering. For example, an input channel 204 not desired for steering may be dispersed by the optical subsystem 209 such that the undesired input channel 204 does not pass through the cylindrical lens 215. Any input channel 204 of the input signal 201 or any output channel 206 of the one or more output signals 219 may interact in any manner other than described or not interact at all with the components of the WSS 200 if that input channel 204 or output channel 206 is not desired for steering. Thus, if the input channel 204 or output channel 206 is not desired for steering, that input channel 204 or output channel 206 may reflect, refract, diffract, converge, diverge, focus, disperse, or behave in any manner without changing the scope of this disclosure.

Additionally, the input signal 201 or the one or more output signals 219 may pass through any portion of the components of the WSS 200. For example, the input signal 201 is not limited to pass through the middle of the optical subsystem 209. Rather the input signal 201 may pass through the optical subsystem 209 near an edge of the optical subsystem 209, sufficient to substantially disperse the input signal 209 into separate input channels 206 of the input signal 201. The input signal 201 or the one or more output signals 219 may be configured to similarly pass through any portion of the components of the WSS 200, individually or in any combination, without changing the scope of the disclosure.

The optical subsystem 209 is illustrated in FIGS. 2*a*-2*d* as including both the collimating lens 211 and the dispersive element 213 as discrete components, with the cylindrical lens 215 being a discrete component with respect to the optical subsystem 209. In other embodiments, two or more of the collimating lens 211, the dispersive element 213, and the cylindrical lens 215, or at least their respective functionality, may be integrated into a single component. For example, one or both of a collimating lens and a cylindrical lens (or associated structure) may be incorporated into the structure of a dispersive element such as a diffraction grating, similar in at least some respects to a Fresnel lens.

Furthermore, it is well known in the art that in general optical systems, lenses may be replaced with other elements such as shaped mirrors to produce substantially similar results. As such, the lenses mentioned in the present disclosure are not limited to elements in which light passes through, but may be replaced by any number and combination of shaped mirrors that produce substantially similar results of the aforementioned lenses described in the disclosure.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A wavelength selective switch, comprising:
   a steering element;
   an optical subsystem configured to collimate and demultiplex an input multimode optical signal into input discrete wavelength channels, the optical subsystem comprising a collimating lens and a dispersive element, wherein:
   the optical subsystem is located between a fiber array and the steering element; and
   the collimating lens is located between the fiber array and the dispersive element;
   a cylindrical lens located between the optical subsystem and the steering element.

2. The wavelength selective switch of claim 1, wherein:
   the collimating lens is positioned substantially one collimating lens focal length from the fiber array;
   the steering element is positioned substantially one collimating lens focal length from the collimating lens;

the cylindrical lens is positioned substantially one cylindrical lens focal length from the steering element; and the cylindrical lens is positioned substantially one cylindrical lens focal length from the dispersive element.

3. The wavelength selective switch of claim 1, wherein the collimating lens comprises an aspheric lens.

4. The wavelength selective switch of claim 1, wherein the dispersive element comprises a diffraction grating.

5. The wavelength selective switch of claim 1, wherein the steering element comprises a liquid crystal on silicon device.

6. The wavelength selective switch of claim 1, wherein the fiber array comprises an array of multimode fibers.

7. The wavelength selective switch of claim 1, wherein:
the optical subsystem is configured to collimate and demultiplex the input multimode optical signal into input discrete wavelength channels, wherein the optical subsystem is configured to receive the input multimode optical signal from an input fiber of the fiber array that includes the input fiber and a plurality of output fibers;
the cylindrical lens is configured to focus in one dimension the input discrete wavelength channels onto the steering element; and
the steering element is configured to independently redirect the input discrete wavelength channels, such that the redirected input discrete wavelength channels become output discrete wavelength channels; wherein:
the cylindrical lens is further configured to diverge in one-direction the output discrete wavelength channels onto the optical subsystem; and
the optical subsystem is further configured to converge the output discrete wavelength channels onto at least one output fiber of the plurality of output fibers.

8. A wavelength selective switch comprising:
an optical subsystem configured to collimate and demultiplex an input multimode optical signal into input discrete wavelength channels, wherein the optical subsystem is configured to receive the input multimode optical signal from an input fiber of a fiber array that includes the input fiber and a plurality of output fibers;
a cylindrical lens configured to focus in one dimension the input discrete wavelength channels onto a steering element, wherein the cylindrical lens is positioned to be substantially one focal length of the cylindrical lens from the optical subsystem and substantially one focal length of the cylindrical lens from the steering element; and
the steering element configured to independently redirect the input discrete wavelength channels, such that the redirected input discrete wavelength channels become output discrete wavelength channels; wherein:
the cylindrical lens is further configured to diverge in one-direction the output discrete wavelength channels onto the optical subsystem; and
the optical subsystem is further configured to converge the output discrete wavelength channels onto at least one output fiber of the plurality of output fibers.

9. The wavelength selective switch of claim 8, wherein the optical subsystem comprises:
an aspheric lens configured to collimate the input multimode optical signal, wherein the aspheric lens is positioned such that there is substantially one focal length of the aspheric lens between the aspheric lens and the fiber array and there is substantially one focal length of the aspheric lens from the aspheric lens to the steering element; and
a dispersive element configured to demultiplex the collimated input multimode optical signal, wherein the aspheric lens is further configured to converge the output discrete wavelength channels onto at least one output fiber.

10. The wavelength selective switch of claim 9, wherein:
fibers of the fiber array are vertically spaced apart from each other in a line;
the dispersive element is configured to demultiplex the collimated input multimode optical signal by being angled relative to the input fiber to horizontally separate the input discrete wavelength channels within the collimated input multimode optical signal from each other; and
the steering element is configured to independently redirect the input discrete wavelength channels by independently vertically redirecting the input discrete wavelength channels.

11. The wavelength selective switch of claim 9, wherein the dispersive element comprises a diffraction grating.

12. The wavelength selective switch of claim 8, wherein the steering element comprises a liquid crystal on silicon device.

13. A method comprising:
collimating an input multiplexed multimode optical signal;
demultiplexing the input multiplexed multimode optical signal into discrete wavelength channels;
focusing each of the discrete wavelength channels in one dimension, such that the discrete wavelength channels are incident on a steering element in substantially different locations;
selectively redirecting the discrete wavelength channels;
collimating the redirected discrete wavelength channels in the one dimension; and
converging each of the redirected discrete wavelength channels into at least one output fiber.

14. The method of claim 13, wherein converging each of the redirected discrete wavelength channels into the at least one output fiber comprises converging each of the redirected discrete wavelength channels into a different corresponding one of a plurality of output fibers.

15. The method of claim 13, wherein converging each of the redirected discrete wavelength channels into the at least one output fiber comprises converging all of the redirected discrete wavelength channels into a single output fiber.

16. The method of claim 13, wherein:
demultiplexing the input multiplexed multimode optical signal into discrete wavelength channels includes horizontally separating, at least partially, the discrete wavelength channels from each other;
focusing each of the discrete wavelength channels in one dimension comprises focusing each of the discrete wavelength channels horizontally; and
collimating the redirected discrete wavelength channels comprises horizontally collimating the redirected discrete wavelength channels.

17. The method of claim 16, wherein the horizontally separating occurs in response to dispersing the discrete wavelength channels by a dispersive element.

* * * * *